Patented May 23, 1939

2,159,585

UNITED STATES PATENT OFFICE

2,159,585

COMPOUNDS OF COPPER, ARSENIC, AND A SULPHMONOCARBOXYLIC ACID AND PROCESS OF MAKING THEM

Frederick E. Dearborn, Washington, D. C.; dedicated to the free use of the People of the United States of America No Drawing. Application January 28, 1938, Serial No. 187,574

7 Claims. (Cl. 260—399)

(Granted under the act of March 3, 1883, as amended April 30, 1928; 370 O. G. 757)

This application is made under the act approved March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the People of the United States of America to take effect on the granting of a patent to me.

This invention embraces a new compound or compounds, having the composition hereinafter specifically set forth and the mode or process of manufacturing the same which will be hereinafter fully described. It is to be understood, however, that changes may be made in such composition of matter and in the step or steps relating thereto, within the scope of the appended claims, without departing from the spirit of the invention.

I have found that a complex compound or compounds can be prepared containing arsenic, copper, and a sulph-monocarboxylic acid of the general formula $C_nH_{2n-2}SO_2$. The compound or compounds are greenish in color and are suitable for insecticidal and fungicidal uses. They differ in composition from the compounds defined by United States Patent 2,080,004 in that the element sulphur has been introduced into the molecule, imparting different chemical and physical properties to them. They are practically insoluble in water, and when dry are not wet by it without the use of a wetting agent.

As indicated the principal and poisonous ingredient in my new insecticide or insecticides comprises mainly a complex compound composed of copper meta-arsenite united with a copper salt of a sulph-monocarboxylic acid of the general formula $C_nH_{2n-2}SO_2$, for example copper sulph-crotoarsenite of probable formula $$3CuAs_2O_4.CuC_8H_{10}S_2O_4$$

theoretically containing 52.53 percent arsenious oxide ($As_2O_3$), 28.16 percent copper oxide (CuO), and 19.31 percent sulph-crotonic anhydride.

In carrying out my invention I first prepare the sulph-unsaturated fatty acid by heating a fatty acid of series $C_nH_{2n-2}O_2$ or its glyceride with sulphur at a temperature ranging from 160–210° C. or higher, until the sulphur has combined with the unsaturated fatty acid. The addition of a small amount of iodine as a catalyst hastens the reaction which is sometimes very vigorous with evolution of considerable heat. This is especially true when the glycerides of the unsaturated fatty acids are used. The sulphur is apparently added to the unsaturated fatty acid at the double bond. All of the acids belonging to the series $C_nH_{2n-2}O_2$ contain one double bond and are capable of adding one atom of sulphur to form the new acid series $C_nH_{2n-2}SO_2$. The acids below oleic are heated with sulphur in sealed vessels to prevent the escape of reactants. Applications for patent, Serial Nos. 125,273, 125,274, and 125,275 have been made covering the sulph-unsaturated fatty acids, their sulph-glycerides and the process of making the same. The sulph-fatty acids or their sulph-glycerides retain some unreacted sulphur as an impurity. This may be removed by boiling with a solution of an alkali metal salt, converting the sulph-acids or sulph-glycerides into the alkali metal salt, producing a soap. The soap may be salted out of solution, removed and further purified, or the original soap solution used in preparing my new compounds. The insecticide prepared from the unpurified soap will contain some copper sulphide and possibly other insoluble sulphides as impurities. In preparing the sulph-unsaturated fatty acids, the free acid or a vegetable, animal or fish oil containing appreciable amounts of unsaturated acids of series $C_nH_{2n-2}O_2$ may be used.

To the boiling solution of the alkali metal salt of a sulph-acid is added a hot solution of an alkali metal arsenite, any excess alkali is neutralized with a dilute mineral acid, such as $H_2SO_4$, and then a solution of a soluble copper salt, such as $CuSO_4$ or $CuCl_2$ is added with vigorous agitation. When all of the copper salt has been added, the mixture should be neutral or very faintly acid in reaction, if not, it is made so by the addition of dilute alkali or mineral acid. The mixture is now boiled for half an hour or longer to cause complete reaction and granulation of the compound. Before filtering it is better to make the mixture slightly acid by adding dilute $H_2SO_4$, to dissolve any unreacted copper arsenite that may be present. It is preferable to allow the reacted mixture to stand until cold with occasional agitation, when it is filtered and well washed to remove soluble impurities, and then dried.

The proportions of copper, arsenic, and sulph-monocarboxylic acid salts to be mixed may be calculated from the formula $3CuAs_2O_4.CuOR$, in which R represents the sulph-monocarboxylic anhydride. For example, the following are given as illustrations:

(a) Copper sulph-acrylicoarsenite of probable formula $3CuAs_2O_4.CuC_6H_6S_2O_4$, theoretically containing 57.19 per cent arsenious oxide ($As_2O_3$), 30.66 percent copper oxide (CuO) and 12.15 percent sulph-acrylic anhydride. To produce 100 grams of the compound the following weights of materials are required:

| | Grams |
|---|---|
| Sodium arsenite ($Na_2HAsO_3$) | 98.1 |
| Copper sulphate ($CuSO_4.5H_2O$) | 96.3 |
| Sodium sulph-acrylate | 18.3 |

(b) Copper sulf-oleoarsenite of probable formula $3CuAs_2O_4.CuC_{36}H_{66}S_2O_4$, theoretically containing 38.99 percent arsenious oxide ($As_2O_3$), 20.83 percent copper oxide (CuO), and 40.18 percent sulf-oleic anhydride. To produce 100 grams of the compound the following weights of materials are required:

| | Grams |
|---|---|
| Potassium arsenite ($KAsO_2$) | 57.6 |
| Cupric chloride ($CuCl_2.2H_2O$) | 44.7 |
| Sodium sulf-oleate | 72.9 |

(c) Copper sulph-erucoarsenite of probable formula $3CuAs_2O_4.CuC_{44}H_{82}S_2O_4$, theoretically containing 36.32 percent arsenious oxide ($As_2O_3$), 19.47 percent copper oxide (CuO), and 44.21 percent sulph-erucic anhydride. To produce 100 grams of the compound the following weights of materials are required:

| | Grams |
|---|---|
| Arsenious oxide ($As_2O_3$) | 36.4 |
| Sodium hydroxide (NaOH) | 29.4 |
| Copper sulphate ($CuSO_4.5H_2O$) | 61.1 |
| Sodium sulph-eruciate | 81.4 |

Having thus described my invention, I claim:

1. A new compound of the general formula $3CuAs_2O_4.CuOR$ in which R is the anhydride of a sulph-monocarboxylic acid of the general formula $C_nH_{2n-2}SO_2$.

2. A new insecticide and fungicide consisting of the complex product of the reaction between a solution of an inorganic soluble copper salt, an alkali metal arsenite, and an alkali metal salt of the sulph-monocarboxylic acids of the general formula $C_nH_{2n-2}SO_2$.

3. A new compound of the general formula $3CuAs_2O_4.CuOR$, in which R is the anhydride of sulph-acrylic acid.

4. A new compound of the general formula $3CuAs_2O_4.CuOR$, in which R is the anhydride of sulph-oleic acid.

5. A new compound of the general formula $3CuAs_2O_4.CuOR$, in which R is the anhydride of sulph-erucic acid.

6. As an insecticide and fungicide, a compound of the general formula, $3CuAs_2O_4.CuOR$, in which R is the anhydride of a sulph-monocarboxylic acid of the general formula $C_nH_{2n-2}SO_2$, containing from 3 to 22 carbon atoms in its molecule.

7. A process of manufacturing a compound of the general formula $3CuAs_2O_4.CuOR$, in which R is the anhydride of a sulph-monocarboxylic acid of the general formula $C_nH_{2n-2}SO_2$ containing from 3 to 22 carbon atoms in its molecule; which comprises bringing together a solution of alkali metal arsenite, a solution of a water soluble inorganic cupric salt, and a solution of an alkali metal salt of a sulph-monocarboxylic acid of the general formula $C_nH_{2n-2}SO_2$ containing from 3 to 22 carbon atoms in its molecule obtained by saponifying an oil containing glycerides of $C_nH_{2n-2}O_2$ series of acids in which one atom of sulphur has been added to the unsaturated acid radical by heating with sulphur from 160° to 210° C.; heating and agitating the mixture until the reactions have been completed, washing and drying the product.

FREDERICK E. DEARBORN.